(12) United States Patent
Takahara et al.

(10) Patent No.: US 10,844,984 B2
(45) Date of Patent: Nov. 24, 2020

(54) FLANGE FASTENING STRUCTURE

(71) Applicant: HONDA MOTOR CO., LTD., Tokyo (JP)

(72) Inventors: Ryosaku Takahara, Wako (JP); Yoshiaki Hatakeyama, Wako (JP); Kenta Kawano, Wako (JP); Hideaki Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 16/354,433

(22) Filed: Mar. 15, 2019

(65) Prior Publication Data
US 2019/0285210 A1 Sep. 19, 2019

(30) Foreign Application Priority Data
Mar. 15, 2018 (JP) .................. 2018-047609

(51) Int. Cl.
*F16L 23/08* (2006.01)
*F16L 23/18* (2006.01)
*F01D 25/30* (2006.01)

(52) U.S. Cl.
CPC ............ *F16L 23/08* (2013.01); *F01D 25/30* (2013.01); *F16L 23/18* (2013.01); *F05D 2220/40* (2013.01); *F05D 2230/60* (2013.01); *F05D 2240/55* (2013.01)

(58) Field of Classification Search
CPC .................................. F16L 23/08; F16L 23/18
USPC .......................... 285/364–365, 367, 406–407
See application file for complete search history.

(56) References Cited

U.S. PATENT DOCUMENTS

| | | | | |
|---|---|---|---|---|
| 144,997 A | * | 11/1873 | Mayall | F16L 33/02 285/252 |
| 2,789,844 A | * | 4/1957 | Kessler | F16L 23/22 285/336 |
| 2,834,087 A | * | 5/1958 | Herman | F16L 23/10 24/279 |

(Continued)

FOREIGN PATENT DOCUMENTS

| GB | 2084235 A | * 4/1982 | .............. F16L 23/08 |
|---|---|---|---|
| JP | 2005-344580 A | 12/2005 | |

(Continued)

OTHER PUBLICATIONS

Office Action dated Aug. 28, 2019, issued in counterpart JP Application No. 2018-047609, with English translation (6 pages).

*Primary Examiner* — Matthew Troutman
*Assistant Examiner* — Fannie C Kee
(74) *Attorney, Agent, or Firm* — Westerman, Hattori, Daniels & Adrian, LLP

(57) ABSTRACT

In a flange fastening structure, a turbocharger includes a wastegate decentered from a center of a first flange that surrounds an outlet opening of the turbocharger. A bolt of a V-band that fastens the first flange on the turbocharger to a second flange on an exhaust passage member is disposed in a first region. The first region is a region composed of two sector-shaped regions each having a central angle of 90 degrees from a straight line from the center through a point that is on the first flange and that is closest to a maximum opening portion of the wastegate toward a corresponding side in a circumferential direction.

1 Claim, 4 Drawing Sheets

(56) References Cited

U.S. PATENT DOCUMENTS

| | | | | |
|---|---|---|---|---|
| 2,841,420 A | * | 7/1958 | Woolsey | F16L 23/10 |
| | | | | 285/421 |
| 2,862,731 A | * | 12/1958 | Hedden | F16L 27/0816 |
| | | | | 285/272 |
| 3,498,649 A | * | 3/1970 | Pfeuffer | F16L 23/04 |
| | | | | 285/365 |
| 2005/0253387 A1 | * | 11/2005 | Fritz | F01N 13/1844 |
| | | | | 285/365 |

FOREIGN PATENT DOCUMENTS

| JP | 2012-225297 A | 11/2012 |
|---|---|---|
| JP | 2015163778 A | 9/2015 |

\* cited by examiner

FLANGE FASTENING STRUCTURE

CROSS REFERENCES TO RELATED APPLICATIONS

The present application claims priority under 35 U.S.C. § 119 to Japanese Patent Application No. 2018-047609, filed Mar. 15, 2018, entitled "Flange Fastening Structure." The contents of this application are incorporated herein by reference in their entirety.

BACKGROUND

1. Field

The present disclosure relates to a flange fastening structure. In the fastening structure, a turbocharger and an exhaust passage member are integrally coupled to each other by tightening, with a bolt, a fastening member having a ring shape fitted to a first flange, which surrounds the outlet opening of the turbocharger, and a second flange, which surrounds the inlet opening of the exhaust passage member. The first flange and the second flange are in contact with each other with a gasket interposed in between.

2. Description of the Related Art

Japanese Unexamined Patent Application Publication No. 2005-344580 describes a flange fastening structure in which a turbocharger and a catalytic converter are integrally coupled to each other. In the fastening structure, a flange disposed on the outlet opening of the turbocharger and a flange disposed on the inlet opening of the catalytic converter face each other and are fastened to each other with a bolt after a fastening member having a ring shape is fitted to the rim of each of the flanges.

Because the flange disposed on the outlet opening of the turbocharger and the flange disposed on the inlet opening of the catalytic converter are exposed to exhaust gas, the coupling surface of each of the flanges shifts out of place due to thermal expansion, and thus the bearing stress generated by fastening the fastening member having a ring shape to the flanges becomes unstable. This may result in a leakage of exhaust gas. In addition, a gasket interposed between both of the flanges deteriorates due to high temperature, which may result in a leakage of exhaust gas.

There is a need to suppress leakage of exhaust gas from the fastened portion between the flanges of a turbocharger and an exhaust passage member by using a simple structure.

SUMMARY

A flange fastening structure according to an aspect of the present disclosure includes a first flange that has a ring shape and includes a first coupling surface and a first tapered surface and that is disposed to surround an outlet opening of a turbocharger and to be tapered outward in a radial direction, a second flange that has a ring shape and includes a second coupling surface and a second tapered surface and that is disposed to surround an inlet opening of an exhaust passage member and to be tapered outward in a radial direction, a gasket that is interposed between the first coupling surface of the first flange and the second coupling surface of the second flange to be in contact with each other, a fastening member that has a ring shape, which is cut at a portion, and a section having a V-shape to be in contact with the first tapered surface of the first flange and the second tapered surface of the second flange, that includes a pair of separate ends at the portion of the fastening member in a circumferential direction, and that is fitted to a rim of each of the first flange and the second flange, and a bolt that tightens the separate ends of the fastening member in a direction in which the separate ends approach each other and that integrally couples the turbocharger and the exhaust passage member to each other. The turbocharger includes a wastegate decentered from a center of the first flange, and the bolt is disposed in a first region composed of two sector-shaped regions each having a central angle of 90 degrees from a straight line from the center through a first point that is on the first flange and that is closest to a maximum opening portion of the wastegate toward a corresponding side in the circumferential direction. With this structure, a leakage of exhaust gas can be reduced by accurately determining the first region in the first flange that is prone to becoming hot due to the heat of the exhaust gas discharged from the wastegate and by disposing the bolt in the first region and then applying a high fastening force to the bolt. In addition, this structure is simple and inexpensive because the position adjustment of the bolt is simply required without the addition of extra components and processing.

In the flange fastening structure, the turbocharger includes a turbine outlet decentered from the center of the first flange, and when a region composed of two sector-shaped regions each having a central angle of 90 degrees from a straight line from the center through a second point that is on the first flange and that is closest to the turbine outlet toward a corresponding side in the circumferential direction is defined as a second region, the bolt is disposed in a third region in which the first region and the second region overlap each other. With this structure, the temperature distribution of the first flange can be accurately grasped in consideration of the heat of the exhaust gas discharged from the turbine outlet in addition to the heat of the exhaust gas discharged from the wastegate, and thus the optimum position of the bolt can be determined with high accuracy.

A catalytic converter 12 of an embodiment of the present disclosure corresponds to the exhaust passage member of the aspect of the present disclosure. Arms 18d of the embodiment of the present disclosure correspond to the separate ends of the aspect of the present disclosure.

DESCRIPTION OF THE PREFERRED EMBODIMENTS

An embodiment of the present disclosure is described below with reference to FIG. 1 to FIG. 4.

Figure 1:
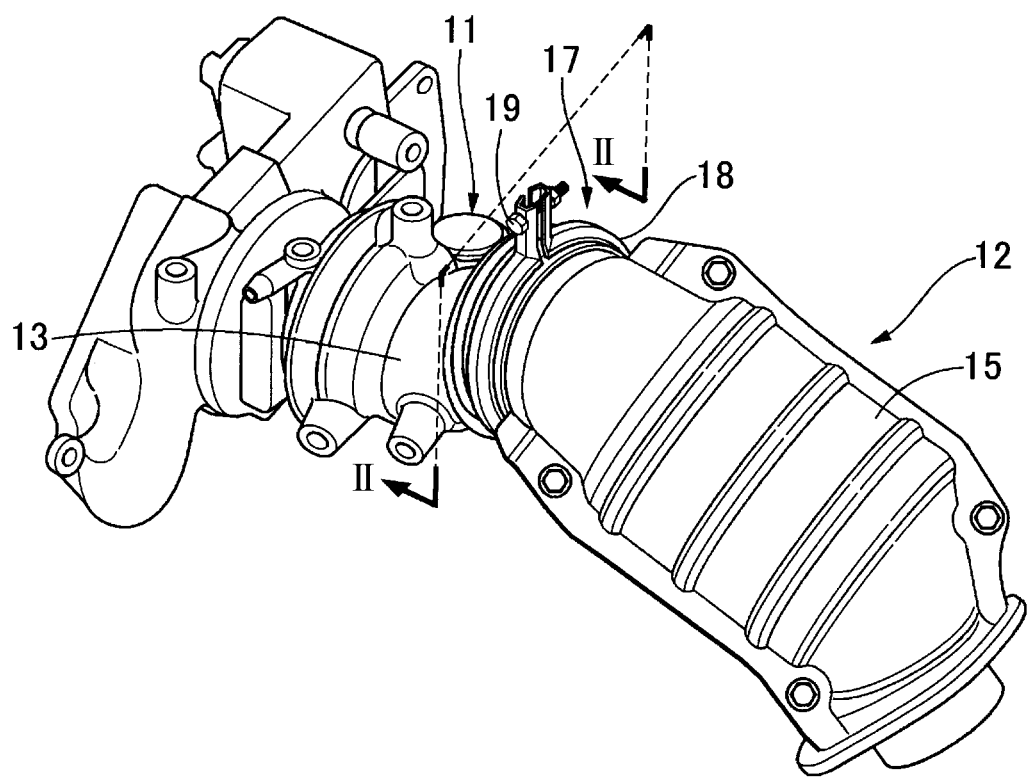
FIG. 1 is a perspective view of a turbocharger and a catalytic converter coupled to each other with a V-band.

As illustrated in FIG. 1, a turbocharger 11 is connected downstream of the exhaust manifold of an engine, and a catalytic converter 12 is connected downstream of the turbocharger 11. The turbocharger 11 drives a turbine with exhaust gas from the engine and increases the output of the engine by supplying air compressed by a compressor connected to the turbine to an air intake system of the engine. The catalytic converter 12 cleans harmful substances such as hydrocarbons, carbon monoxide, and nitrogen oxides, which are contained in the exhaust gas from the engine, by using a catalyst containing platinum, palladium, rhodium, and other substances. The catalytic converter 12 is disposed immediately downstream of the turbocharger 11, where exhaust gas has a high temperature, because the capability of cleaning harmful substances improves as the temperature of the exhaust gas supplied to the catalytic converter 12 increases.

Figure 2:
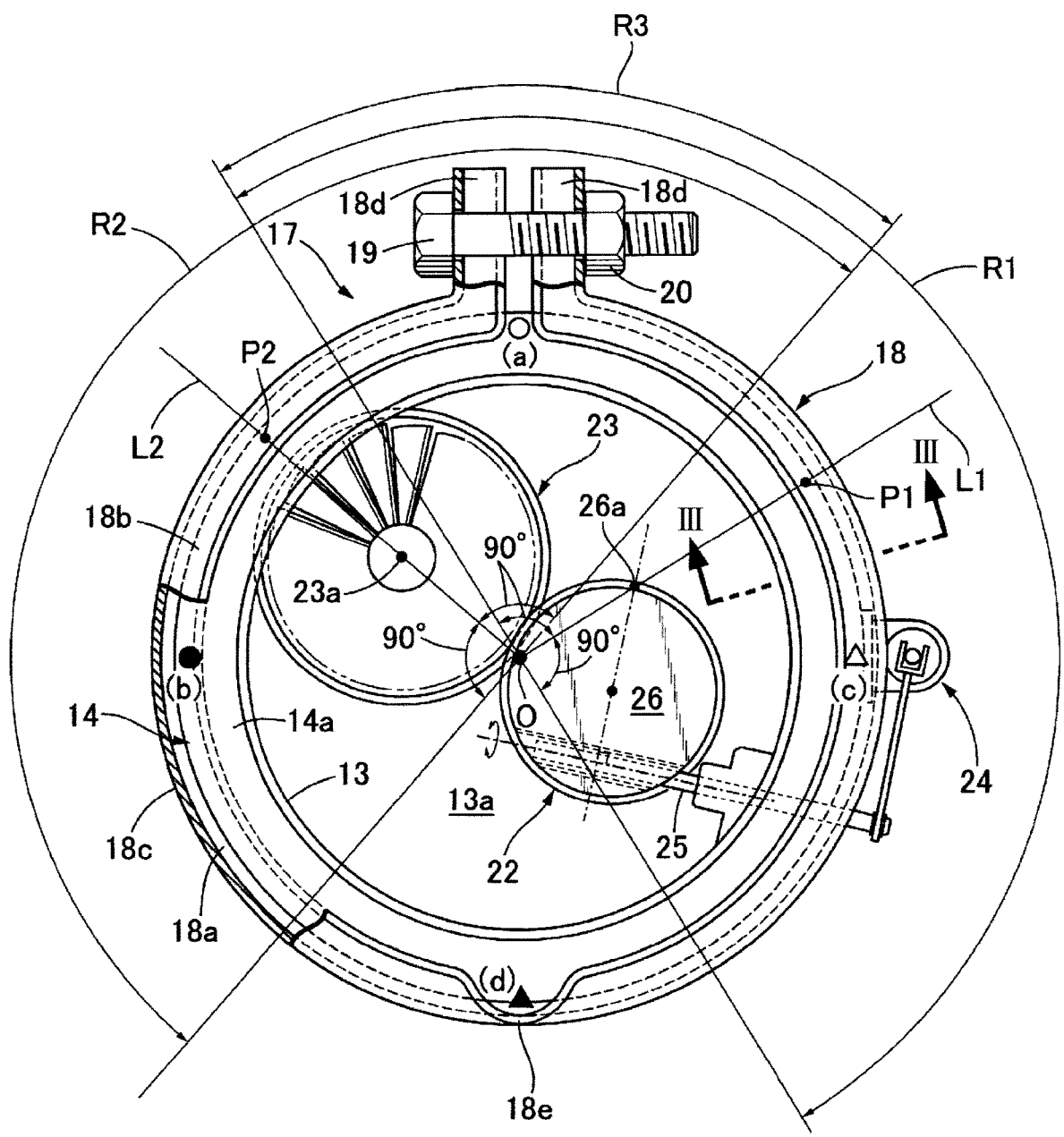
FIG. 2 is an enlarged sectional view taken along line II-II in FIG. 1.
Figure 3A:
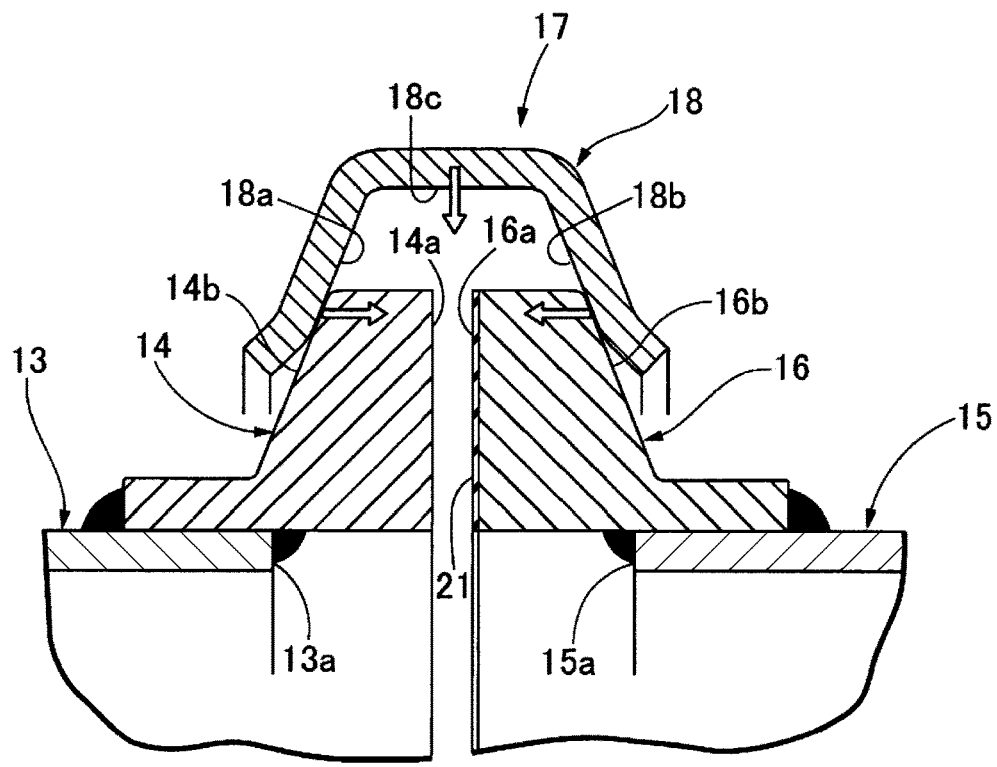
FIGS. 3A and 3B are enlarged sectional views taken along line III-III in FIG. 2.
Figure 3B:
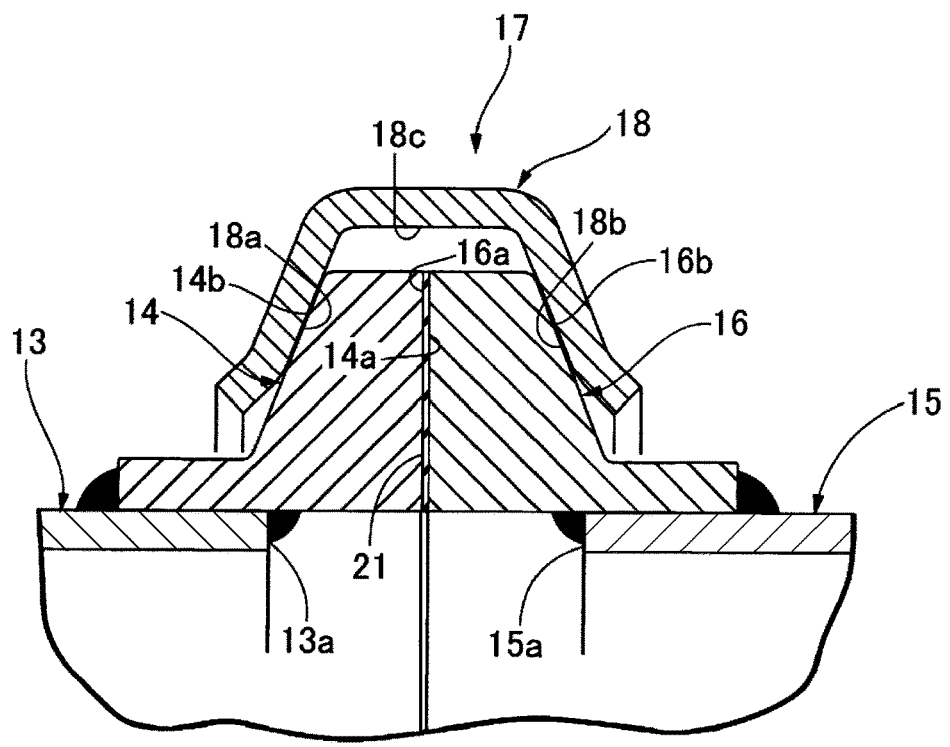

As illustrated in FIG. 2 to FIG. 3B, a first flange 14 having a ring shape and tapered outward in the radial direction is disposed on an outlet opening 13a, which is a circular section of a casing 13 of the turbocharger 11. The first flange 14 includes a coupling surface 14a orthogonal to the axis of the casing 13, and a first tapered surface 14b tapered outward in the radial direction with respect to the coupling surface 14a. A second flange 16 having a ring shape and tapered outward in the radial direction is disposed on an inlet opening 15a, which is a circular section of a casing 15 of the catalytic converter 12. The second flange 16 includes a coupling surface 16a orthogonal to the axis of the casing 15, and a second tapered surface 16b tapered outward in the radial direction with respect to the coupling surface 16a.

The first flange 14 on the turbocharger 11 and the second flange 16 on the catalytic converter 12 are integrally coupled to each other by a coupling unit called a V-band 17. A fastening member 18, which is the main body of the V-band 17, is a ring-shaped member which is cut at a portion. A section of the fastening member 18 has a V-shape composed of a first tapered surface 18a, a second tapered surface 18b, and a periphery surface 18c. Arms 18d each protrude outward in the radial direction from a corresponding end of a pair of separate ends of the fastening member 18. A hinge 18e having the periphery surface 18c without the first tapered surface 18a and the second tapered surface 18b is formed at a position that is shifted 180 degrees relative to the arms 18d. The elastic deformation of the hinge 18e enables the fastening member 18 to open and close so as to move the arms 18d away from or toward each other. The fastening member 18 can be tightened by screwing a bolt 19 that passes through the arms 18d into a nut 20 to reduce the diameter of the fastening member 18.

To couple the turbocharger 11 to the catalytic converter 12, the fastening member 18 of the V-band 17 is fitted to the rim of each of the first flange 14 and the second flange 16 in a state in which the coupling surface 14a of the first flange 14 on the turbocharger 11 and the coupling surface 16a of the second flange 16 on the catalytic converter 12 face each other with a gasket 21 interposed between the coupling surface 14a and the coupling surface 16a (see FIG. 3A). When the fastening member 18 is tightened by screwing the bolt 19 into the nut 20 in this state, the first tapered surface 14b of the first flange 14 pressed by the first tapered surface 18a of the fastening member 18 that moves inward in the radial direction and the second tapered surface 16b of the second flange 16 pressed by the second tapered surface 18b of the fastening member 18 that moves inward in the radial direction move toward each other. The coupling surface 14a of the first flange 14 and the coupling surface 16a of the second flange 16 are fastened with the gasket 21 interposed therebetween, and the turbocharger 11 and the catalytic converter 12 are integrally coupled to each other (see FIG. 3B).

The casing 13 of the turbocharger 11 and the casing 15 of the catalytic converter 12, through which exhaust gas having a high temperature flows, are deformed due to thermal expansion. As a result, the bearing stress distribution between the coupling surface 14a of the first flange 14 and the coupling surface 16a of the second flange 16 becomes uneven in the circumferential direction, and the gasket 21 interposed between the first flange 14 on the turbocharger 11 and the second flange 16 on the catalytic converter 12 deteriorates due to thermal fatigue when the first flange 14 on the turbocharger 11 and the second flange 16 on the catalytic converter 12 are fastened to each other by the V-band 17. Thus, exhaust gas may easily leak from the fastened portion between the first flange 14 and the second flange 16.

Leakage of the exhaust gas from the fastened portion between the first flange 14 and the second flange 16 can be effectively reduced by grasping the temperature distribution of the first flange 14 on the turbocharger 11 and the second flange 16 on the catalytic converter 12 in the circumferential direction and by tightly fastening, with the V-band 17, the portions thereof that are prone to becoming hot and loosely fastening, with the V-band 17, the portions thereof that are not prone to becoming hot.

Figure 4:
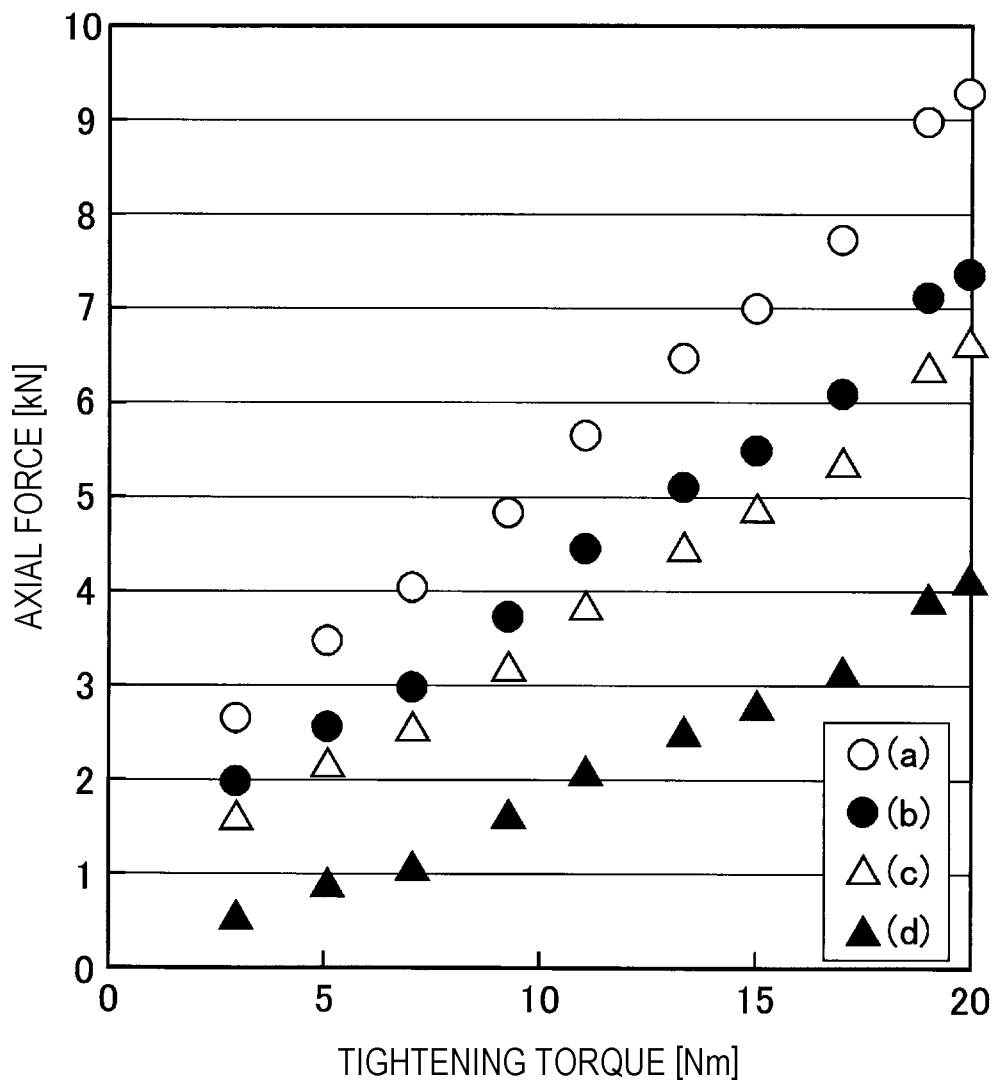
FIG. 4 is a graph indicating the axial forces by which a first flange and a second flange are pressed against each other with the V-band.

The graph illustrated in FIG. 4 indicates the axial forces by which the V-band 17 presses the first flange 14 and the second flange 16 against each other. The axial forces vary depending on the positions of the fastening member 18 of the V-band 17 in the circumferential direction. The highest axial force is measured at the position of the bolt 19 (see position (a) in FIG. 2), the lowest axial force is measured at the position of the hinge 18e (see position (d) in FIG. 2), the position of which is shifted 180 degrees relative to the position of the bolt 19, and a moderate axial force is measured at the midpoint position between the bolt 19 and the hinge 18e (see positions (b) and (c) in FIG. 2). This tendency is constant regardless of the level of the tightening torque applied to the bolt 19. Thus, leakage of the exhaust gas from the fastened portion between the first flange 14 and the second flange 16 can be effectively reduced by grasping the temperature distribution of the first flange 14 and the second flange 16 in the circumferential direction and by positioning the bolt 19 of the V-band 17 near the portions thereof that are most prone to becoming hot.

FIG. 2 illustrates the outlet of the turbocharger 11 viewed in the axial direction. A wastegate 22 and a turbine outlet 23 are disposed at positions decentered from a center O of the first flange 14 inside the casing 13 of the turbocharger 11.

The wastegate 22 includes a valve body 26 that is opened or closed by an actuator 24 so as to pivot around a hinge shaft 25. When the valve body 26 pivots toward the front of the figure, the valve body 26 is opened and discharges exhaust gas toward the outlet opening 13a. The wastegate 22 has a function by which some of the exhaust gas to be supplied to the turbine bypasses the turbine. When a high boost pressure is required, the wastegate 22 is closed to increase the flow of the exhaust gas to be supplied to the turbine, whereas when a high boost pressure is not required, the wastegate 22 is opened to reduce the flow of the exhaust gas to be supplied to the turbine.

When the valve body 26 of the wastegate 22 is opened, a maximum opening portion 26a through which the most exhaust gas flows is positioned farthest from the hinge shaft 25 of the valve body 26. The temperature of the maximum opening portion 26a is the maximum temperature in the outlet opening 13a of the turbocharger 11. A straight line L1 passing through the maximum opening portion 26a is drawn from the center O of the first flange 14, and the two sector-shaped regions each having a central angle of 90 degrees from the straight line from the center O through a point P1, at which the straight line L1 intersects the first flange 14 and which is the point on the first flange 14 closest to the maximum opening portion 26a of the wastegate 22, in a corresponding one of the clockwise and counterclockwise directions are defined as a first region R1. The first region R1 is a high-temperature region in the first flange 14 due to the exhaust gas discharged from the wastegate 22. Thus, the reduction in the bearing stress generated by fastening the first flange 14 to the second flange 16 and deterioration of the gasket 21 due to exhaust gas heat can be compensated for by disposing the bolt 19 of the V-band 17 in the first region R1, and leakage of exhaust gas can be effectively reduced.

Although the exhaust gas discharged from the turbine outlet 23 through the turbine has a temperature lower than that of the exhaust gas discharged from the wastegate 22, the temperature of the exhaust gas discharged from the turbine outlet 23 is still high. This causes thermal expansion of the first flange 14 and the second flange 16 or deterioration of the gasket 21.

A straight line L2 passing through a center 23a of the turbine outlet 23 is drawn from the center O of the first flange 14, and the two sector-shaped regions each having a central angle of 90 degrees from the straight line from the center O through a point P2, at which the straight line L2 intersects the first flange 14 and which is the point on the first flange 14 closest to the turbine outlet 23, in a corresponding one of the clockwise and counterclockwise directions are defined as a second region R2. The second region R2 is a high-temperature region in the first flange 14 due to the exhaust gas discharged from the turbine outlet 23. Thus, the region in which the first region R1 and the second region R2 overlap each other is defined as a third region R3, and leakage of the exhaust gas from the fastened portion between the first flange 14 and the second flange 16 can be more effectively reduced by disposing the bolt 19 of the V-band 17 in the third region R3.

As described above, according to the embodiment, leakage of exhaust gas can be reduced by accurately determining the temperature distribution of the first flange 14 on the turbocharger 11 and the second flange 16 on the catalytic converter 12, to which the heat of the exhaust gas discharged from the wastegate 22 and the turbine outlet 23 of the turbocharger 11 is applied, and by disposing the bolt 19 near the portions thereof that are most prone to becoming hot and then applying a high fastening force to the bolt 19. In addition, this structure is simple and inexpensive because the position adjustment of the bolt 19 is simply required without the addition of extra components and processing.

The embodiment of the present disclosure is described above. Various design changes can be made without departing from the scope of the present disclosure.

For example, the exhaust passage member of the present disclosure is not limited to the catalytic converter 12 of the embodiment. A component through which exhaust gas passes, such as an exhaust pipe, may be used as an exhaust passage member.

In addition, although the hinge 18e of the fastening member 18 of the embodiment is formed of the periphery surface 18c of the fastening member 18 without a hinge pin, a hinge including a hinge pin may be used.

What is claimed is:
1. A flange fastening structure comprising:
a first flange formed in a ring shape and comprising a first coupling surface and a first tapered surface tapered outward in a radial direction, the first flange surrounding an outlet opening of a turbocharger;
a second flange formed in a ring shape and comprising a second coupling surface and a second tapered surface tapered outward in the radial direction, the second flange surrounding an inlet opening of an exhaust passage member;
a gasket interposed between the first coupling surface of the first flange and the second coupling surface of the second flange to make the first coupling surface and the second coupling surface be in contact with each other via the gasket;
a fastening member having a ring shape that is cut at a portion to form a pair of separate ends in a circumferential direction and a cross-section having a V-shape to be in contact with the first tapered surface of the first flange and the second tapered surface of the second flange so as to be fitted to an outer circumferential shape formed of the first flange and the second flange; and
a bolt configured to tighten the separate ends of the fastening member in a direction in which the separate ends approach each other and integrally couple the turbocharger and the exhaust passage member to each other, wherein
the turbocharger comprises a wastegate and a turbine outlet each decentered from a center of the first flange,
the flange fastening structure has
a first region composed of two sector-shaped regions each having a central angle of 90 degrees from a straight line from the center through a first point that is on the first flange and that is closest to a maximum opening portion of the wastegate toward a corresponding side in the circumferential direction, and
a second region composed of two sector-shaped regions each having a central angle of 90 degrees from a straight line from the center through a second point that is on the first flange and that is closest to the turbine outlet toward a corresponding side in the circumferential direction, and
the bolt is disposed in a third region in which the first region and the second region overlap each other.

* * * * *